United States Patent [19]
Chen et al.

[11] Patent Number: 5,803,570
[45] Date of Patent: Sep. 8, 1998

[54] CALIBRATION SYSTEM AND METHOD FOR DISPLAY OPTICAL SYSTEMS

[75] Inventors: Chungte W. Chen, Irvine; James D. Zimmerman, Venice, both of Calif.; David A. Ansley, Sterling, Va.

[73] Assignee: Raytheon Company, Lexington, Mass.

[21] Appl. No.: 762,114

[22] Filed: Dec. 10, 1996

[51] Int. Cl.⁶ .................................................. G03B 21/14
[52] U.S. Cl. .......................................... 353/122; 348/745
[58] Field of Search ................................. 353/101, 122; 348/745, 806; 345/207

[56] References Cited

U.S. PATENT DOCUMENTS

| | | | |
|---|---|---|---|
| 4,168,890 | 9/1979 | Fisher et al. | 353/101 |
| 4,743,109 | 5/1988 | Harvey | 353/101 |
| 5,105,075 | 4/1992 | Ohta et al. | 353/101 |
| 5,114,223 | 5/1992 | Torigoe et al. | 353/101 |
| 5,231,481 | 7/1993 | Eouzan et al. | 348/745 |
| 5,394,205 | 2/1995 | Ochiai et al. | 353/101 |
| 5,479,225 | 12/1995 | Kuga | 353/101 |
| 5,597,223 | 1/1997 | Watanabe et al. | 353/101 |

*Primary Examiner*—William Dowling
*Attorney, Agent, or Firm*—W. C. Schubert; G. H. Lenzen, Jr.

[57] ABSTRACT

A calibration system and method for a display optical system including a projector and a projection screen. A calibration camera is inserted between the projector and the screen to receive the radiation directly from the projector. The image focused by the camera lens is captured by a charge-coupled device, and processed by a controller. The result is fed back to the image generator of the projector for further improvement in the image quality.

16 Claims, 4 Drawing Sheets

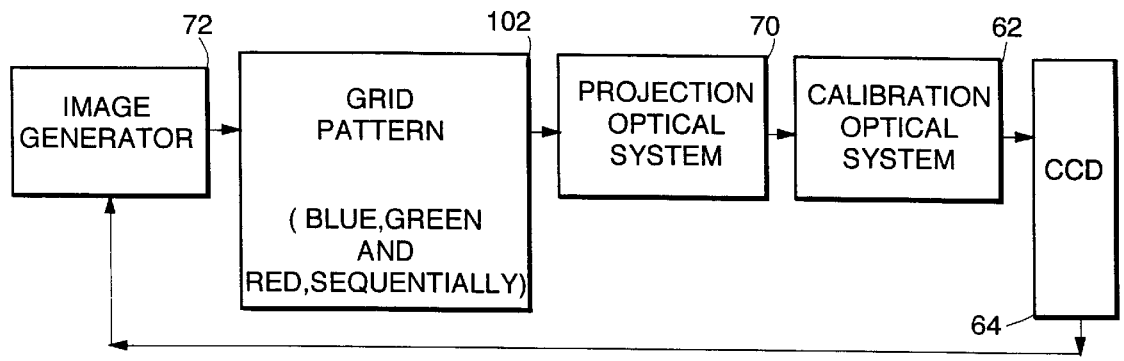
FIG. 3.
FIG. 4.
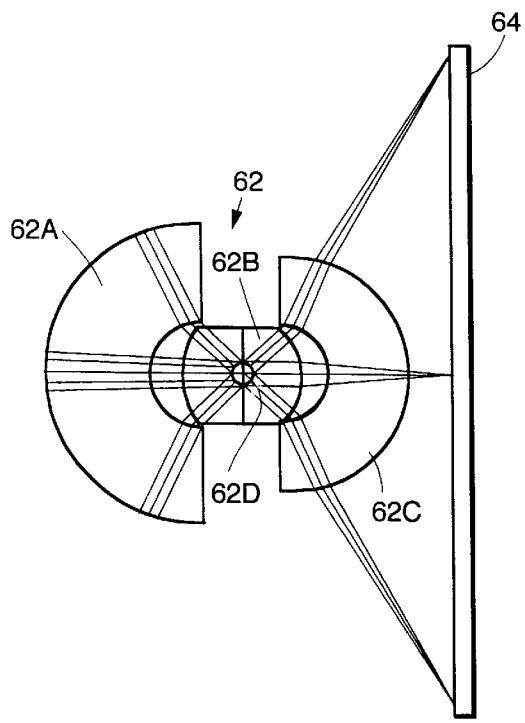

CALIBRATION SYSTEM AND METHOD FOR DISPLAY OPTICAL SYSTEMS

TECHNICAL FIELD OF THE INVENTION

This invention relates to high performance optical systems, and more particularly to methods and devices for calibrating very wide field of view, broad spectral band display optical systems.

BACKGROUND OF THE INVENTION

FIG. 1 is a schematic illustration of a conventional process for calibrating the image quality of a dome simulator. The image is projected onto a screen-by a least one projector 10. The image reflected off the dome screen 12 is further focused by a calibration camera 14 to examine the image quality. Finally, based on the result of the analysis, a correction signal is sent to the image generator of the projector to improve image quality. This iterative process is continued until the best improvement in the image quality has been reached.

Deficiencies with this type of calibration process include the following. First, the numerical aperture of the calibration camera lens has to be large in order to collect enough radiation reflected off the screen. Second, the required field of view (FOV) coverage for the calibration camera is twice as large as that of the projector. Consequently, the calibration camera gets very complex and expensive. Third, several frames or images are required to cover the entire FOV. Consequently, the calibration algorithm gets very complicated.

In direct-view display optical systems such as helmet-mounted displays (HMDs) and head-up displays (HUDs), the image evaluation is generally performed by sampling the image at several discrete field points. Consequently, the evaluation is a tedious and time consuming process.

SUMMARY OF THE INVENTION

A projection optical system including a calibration optical system for performing in-situ calibration of the projection optical system is described. The projection optical system includes an image generator for generating image signals representing an image to be projected, and an optical projector responsive to said image signals for projecting optical radiation producing an optical image corresponding to the image signals. In accordance with an aspect of the invention, a calibration optical system is provided for performing in-situ calibration on the optical images. The calibration optical system includes a calibration camera disposed to receive directly from the optical projector the optical radiation and capture an electronic image of the projected optical image. A controller is responsive to the captured electronic image for generating a correction signal to the image generator to improve the quality of the image projected by the optical projector.

In accordance with another aspect of the invention, the calibration camera comprises a wide-angle lens structure having a field of view at least as large as the projector field of view, wherein a single image captured by the camera covers the entire field of view of the projector.

BRIEF DESCRIPTION OF THE DRAWING

These and other features and advantages of the present invention will become more apparent from the following detailed description of an exemplary embodiment thereof, as illustrated in the accompanying drawings, in which:

FIG. 3 illustrates an exemplary calibration method sequence for the system of FIG. 2.

FIG. 4 is an optical schematic diagram of an ultracompact, wide FOV calibration lens used in the calibration system of FIG. 2.

DETAILED DESCRIPTION OF THE PREFERRED EMBODIMENT

Figure 1:
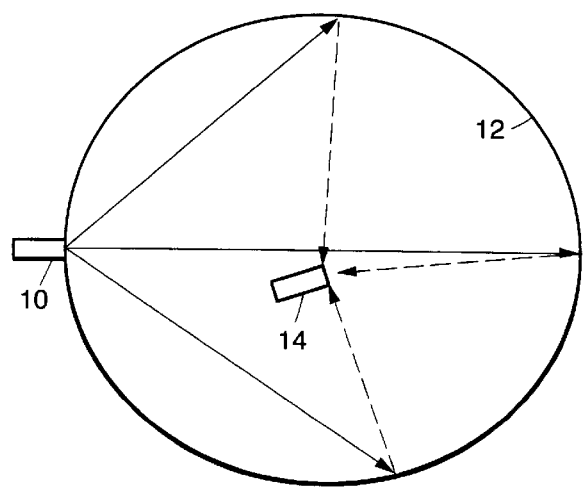
FIG. 1 is a diagram of a conventional image calibration device used for calibrating a simulator system with a dome screen.
Figure 2:
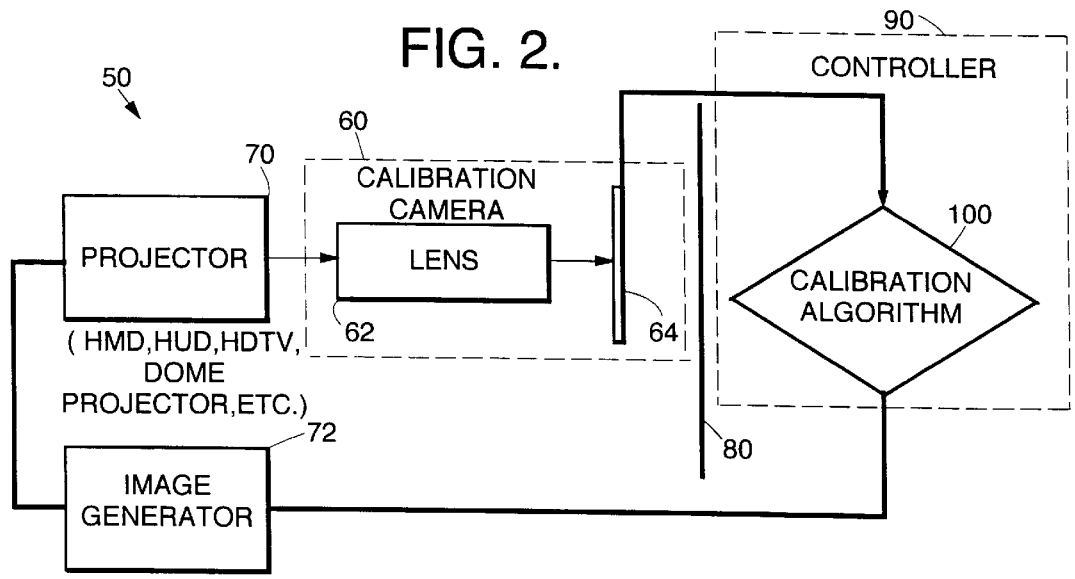
FIG. 2 is a block diagram of a in-situ calibration system according to the present invention.

FIG. 2 depicts a block diagram of a calibration system 50 according to an aspect of this invention. A calibration camera 60 is inserted between the projector 70 and the screen 80 to receive the radiation directly from the projector 70. The camera 60 includes a lens 62 and a charge coupled device (CCD) array 64 for capturing the received image in electronic form. Preferably, the entrance pupil of the lens 62 matches the exit pupil of the lens system of the projector 70, in order to minimize the size of the lens 62. The image focused by the camera lens 62 is captured electronically by the CCD device 64, and provided to the controller 90 for processing by a calibration algorithm 100. The result of the calibration algorithm is fed back to the image generator 72 comprising the projector 70 for further improvement in the image quality. After the calibration process, the camera is removed from the projector optical path.

The projector 70 can be a helmet mounted display projector, a head-up display projector, a high definition television, a dome simulator system projector, or other type of optical projector.

An exemplary calibration algorithm 100 sequence is illustrated in FIG. 3. The image generator 72 generates a calibration pattern 102 such as a square grid sequentially for each color component, e.g. blue first, then green and finally red. For each color, the CCD array 64 will record the location of each grid. The location differences of the grid among the different colors will then be fed back to the image generator 72. The image generator will readjust the position of each grid for each color such that different color grids are aligned. This process is continually iterated until reaching the desired alignment tolerance.

The advantages associated with the new calibration system and method over the conventional calibration technique include the following. The numerical aperture of the calibration lens 62 can be very small. Rather than collecting light reflected off the screen 80, the in-situ calibration camera 60 focuses the radiation emitted directly from the projector 70. Therefore, the calibration camera 60 can be compact and relatively inexpensive, and have wide FOV coverage with diffraction-limited image quality, i.e., where the image quality is limited by the diffraction effect. An optical system can be either aberration limited or diffraction limited. A diffraction limited image is much sharper than an aberration limited image. The required FOV coverage for the calibration camera 60 is as large as that of the projector 70. Only one frame or image is needed to cover the entire FOV. Consequently, the calibration system and process are relatively easy to implement.

FIG. 4 is a schematic diagram illustrating a preferred embodiment of an ultra-compact, super wide FOV lens assembly suitable for lens 62. The lens assembly 62 includes three lenses 62A, 62B and 62C, and has an overall length about twice that of the effective focal length of the lens assembly. The aperture stop 62D is located in the middle of the central lens 62D. The lenses 62A and 62C are each meniscus shell lenses, fabricated in an exemplary embodiment of Schott SF6 glass. The central lens 62B is fabricated of two elements, one a convex-plano lens element, the other a plano-convex element. The planar surfaces of the two elements are cemented together to form the lens 62B. Each of the lens elements of lens 62B is fabricated of Schott LAK8 glass, in an exemplary embodiment. To achieve such a wide FOV coverage with only a few lenses, the curvature of each lens 62A, 62B, 62C is adjusted to be nearly optically concentric to the aperture stop 62D. The overall lens size is less than 30% of a typical wide angle lens.

Described below are two exemplary applications of a display optical system embodying the invention.

Figure 5:
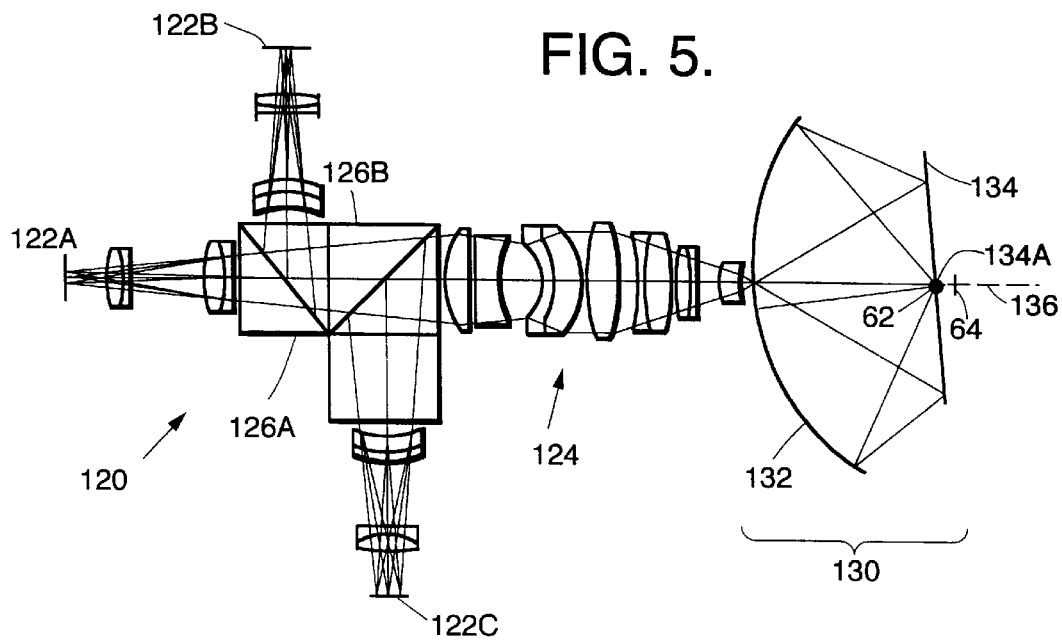
FIG. 5 illustrates an laser target projector system employing the lens of FIG. 4 in a calibration process.

The ultra-compact nature of the lens assembly 62 makes it possible to fit inside the central hole of the "clam shell" of a laser target projector system 120, shown in FIG. 5. In this projector, three projected targets generated by target projectors 122A, 122B and 122C are coupled into the main projection module 124 through the beam splitter cubes 126A, 126B. The combined image is projected through an opening 132A formed in a spherical mirror 132 comprising the clam shell 130 onto aspherical mirror 134, which reflects the image onto the curved surface of the mirror 132. The lens 62 is placed at the center hole 134A on the axis 136 of the projector system, with the CCD array 64 disposed behind the lens to capture the image. The calibration lens can also be used for boresight alignment among different target projectors.

Figure 6:
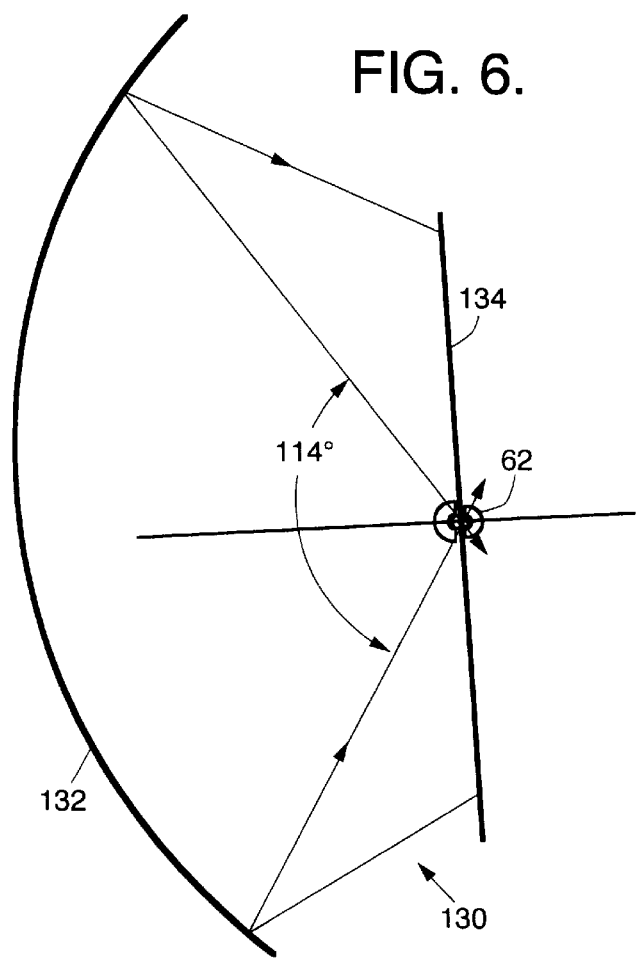
FIG. 6 is a side view of a mirror clam shell arrangement comprising the system of FIG. 5, showing the placement of the lens of FIG. 4 in further detail.

FIG. 6 is an isolation view of the clam shell 130 and wide angle lens 62, and illustrates that the aperture stop of the wide angle calibration lens matches the exit pupil of the projector, to minimize the size of the calibration lens. Since the FOV is more than 110 degrees, once away from the exit pupil, the beam size spreads very quickly. Without such a pupil-matching, it would be impossible to do the calibration with a single frame.

Figure 7:
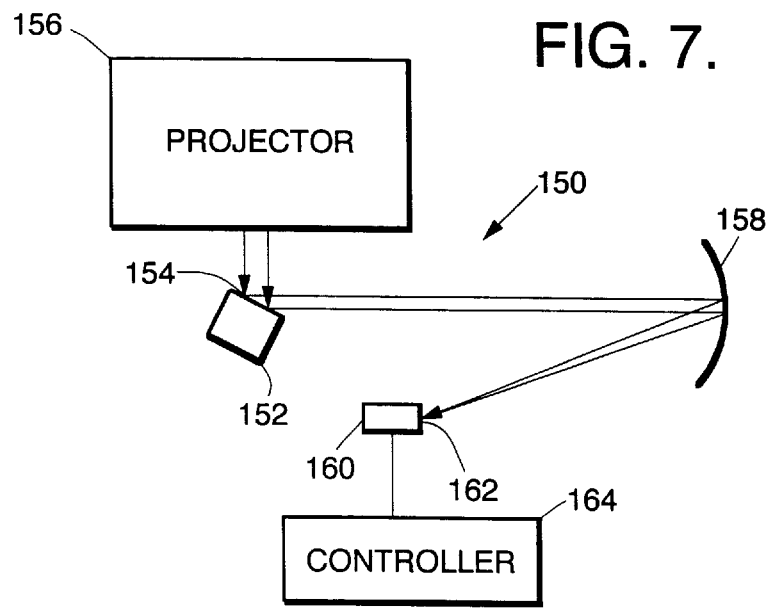
FIG. 7 is a side view of a scanning calibration optical system in accordance with an aspect of the invention.
Figure 8:
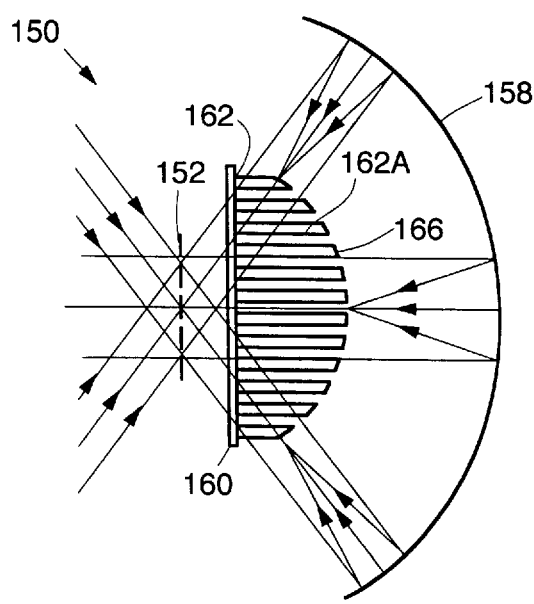
FIG. 8 is a top view of the optical system of FIG. 7.

A one-dimensional scanning calibration optical system embodying the invention is very compact, simple, and has very high resolution. Since a one-dimensional CCD can be used instead of a two-dimensional CCD array, the resolution can be increased. FIGS. 7 and 8 illustrate respective top and side views of a one-dimensional scanning calibration system 150 in accordance with the invention. A scanner 152 such as a polygon scanner is located in the exit pupil position 154 of the projector 156. The scanner scans the incoming projected scene onto a spherical mirror 158, which further focuses it onto a high resolution linear CCD array assembly 160, located at the image surface 162 of the spherical mirror. The system controller 164 receives the scanned image, determines the corrections to be made, and generates image correction signals for the projector 156. The distance between the scanner 152 and the mirror 158 is less than three times the effective focal length of the spherical mirror 158.

In some applications, the CCD array assembly 160 can include either a fiber ribbon or a field lens to match the field curvature of the calibration optical system. The top view of FIG. 8 shows a fiber ribbon 162A whose input surface 166 has a curvature which matches the curvature of the spherical mirror 158. The use of a spherical mirror form has the advantage of simplicity.

It is understood that the above-described embodiments are merely illustrative of the possible specific embodiments which may represent principles of the present invention. Other arrangements may readily be devised in accordance with these principles by those skilled in the art without departing from the scope and spirit of the invention.

What is claimed is:

1. A projection optical system including a calibration optical system for performing in-situ calibration of the projection optical system, comprising:

an image generator for generating image signals representing an image to be projected;

an optical projector responsive to said image signals for projecting optical radiation producing an optical image corresponding to said image signals; and a calibration optical system for performing in-situ calibration on said optical images, comprising a calibration camera disposed to receive directly from said optical projector said optical radiation and capture an electronic image of said projected optical image, and a controller responsive to said captured electronic image for generating a correction signal to said image generator to improve the quality of the image projected by said optical projector.

2. The system of claim 1 wherein said projector has a field of view, and said calibration camera comprises a wide-angle lens structure having a field of view at least as large as said projector field of view, wherein a single image captured by said camera covers the entire field of view of said projector.

3. The system of claim 1 wherein said calibration camera comprises a wide-angle refractive lens assembly having an overall length less than three times its effective focal length.

4. The system of claim 1 wherein said calibration camera includes a charge-coupled device (CCD) for electronically capturing said projected image.

5. The system of claim 1 wherein said projection system is a helmet-mounted display system.

6. The system of claim 1 wherein said projection system is a head-up display system.

7. The projection system of claim 1 wherein said projection system is a high definition projector with a projection screen.

8. A projection optical system including a calibration optical system for performing in-situ calibration of the projection optical system, comprising:

an image generator for generating image signals representing an image to be projected;

an optical projector responsive to said image signals for projecting optical radiation producing an optical image corresponding to said image signals; and a calibration optical system for performing in-situ calibration on said optical images, comprising an optical scanner for scanning said projected image onto a spherical mirror, said mirror focusing said image onto a calibration camera disposed to capture an electronic image of said projected optical image, and a controller responsive to said captured electronic image for generating a correction signal to said image generator to improve the quality of the image projected by said optical projector.

9. The system of claim 8 wherein said optical scanner is spaced from said mirror by a distance less than three times an effective focal length of said mirror.

10. The system of claim 8 wherein said camera includes a one dimensional image capturing device for capturing sequential lines of said projected image being scanned by said scanner.

11. The system of claim 10 wherein said image capturing device is located at an image surface of said mirror.

12. The system of claim 10 wherein said camera further includes an optical curvature matching device in the optical path between said mirror and said image capturing device to match a field curvature of said mirror.

13. The system of claim 12 wherein said optical curvature matching device includes an optical fiber ribbon having a face curvature matching said field curvature of said mirror.

14. A method for performing in-situ calibration of an projection optical system including an image generator for generating image signals representing an image to be projected, and an optical projector responsive to the image signals for projecting optical radiation producing an optical image corresponding to image signals, the method comprising the following steps:

disposing a calibration camera to receive directly from said optical projector said optical radiation;

capturing an electronic image of said projected optical image with said camera; and processing said captured electronic image and generating a correction signal to said image generator to improve the quality of the image projected by said optical projector.

15. The method of claim 14 wherein said projector has a field of view, and said calibration camera comprises a wide-angle lens structure having a field of view at least as large as said projector field of view, wherein a single image captured by said camera covers the entire field of view of said projector.

16. The method of claim 14 wherein said calibration camera comprises a wide-angle refractive lens assembly having an overall length less than three times its effective focal length.

\* \* \* \* \*